Oct. 30, 1956  R. D. LITTLEJOHN  2,768,452
EDUCATIONAL TOY
Filed Aug. 21, 1953  3 Sheets-Sheet 1

INVENTOR.
ROBERT D. LITTLEJOHN
BY
McMorrow, Berman & Davidson
ATTORNEYS

Oct. 30, 1956

R. D. LITTLEJOHN 2,768,452

EDUCATIONAL TOY

Filed Aug. 21, 1953

INVENTOR.
ROBERT D. LITTLEJOHN
BY
McMorrow, Berman & Davidson
ATTORNEYS

Fig. 4

United States Patent Office 2,768,452
Patented Oct. 30, 1956

2,768,452
EDUCATIONAL TOY
Robert D. Littlejohn, Marshall, Tex.

Application August 21, 1953, Serial No. 375,785

2 Claims. (Cl. 35—73)

This invention relates to improved educational game apparatus of the jig-saw puzzle type.

The primary object of the invention is to provide game apparatus of this character which requires putting together a plurality of game pieces representing ingredients or commodities employed in the production of selected edible products, and the treatments and operations involving the ingredients or commodities for producing the selected products.

A further object is to provide means in such game apparatus to enable the player to prove the correctness of the assembling of the game pieces for a selected product.

Another object of the invention is the provision in game apparatus of the character indicated above the product designating blocks of different shapes and instruction sheets related thereto, game pieces being required to be correctly assembled to the product blocks in accordance with the pertinent instructions.

Other features of the invention include a guide preferably in the form of a frame adjacent one end of which a product block is adapted to be engaged to leave spaces in which game pieces are to be placed so that when the space in the frame around the product block has been completely filled with no overlaps, the player will know that he has arrived at the correct solution to produce the product named on the product block.

In the drawings:

Figure 2 is a plan view of a completed game;

Figure 3 is a fragmentary enlarged sectional view taken substantially on the line 3—3 of Figure 2; and Figure 4 is a face view of an instruction sheet showing separate groups of instructions bearing their respective titles which correspond to the product designations of the product blocks.

Figure 1:
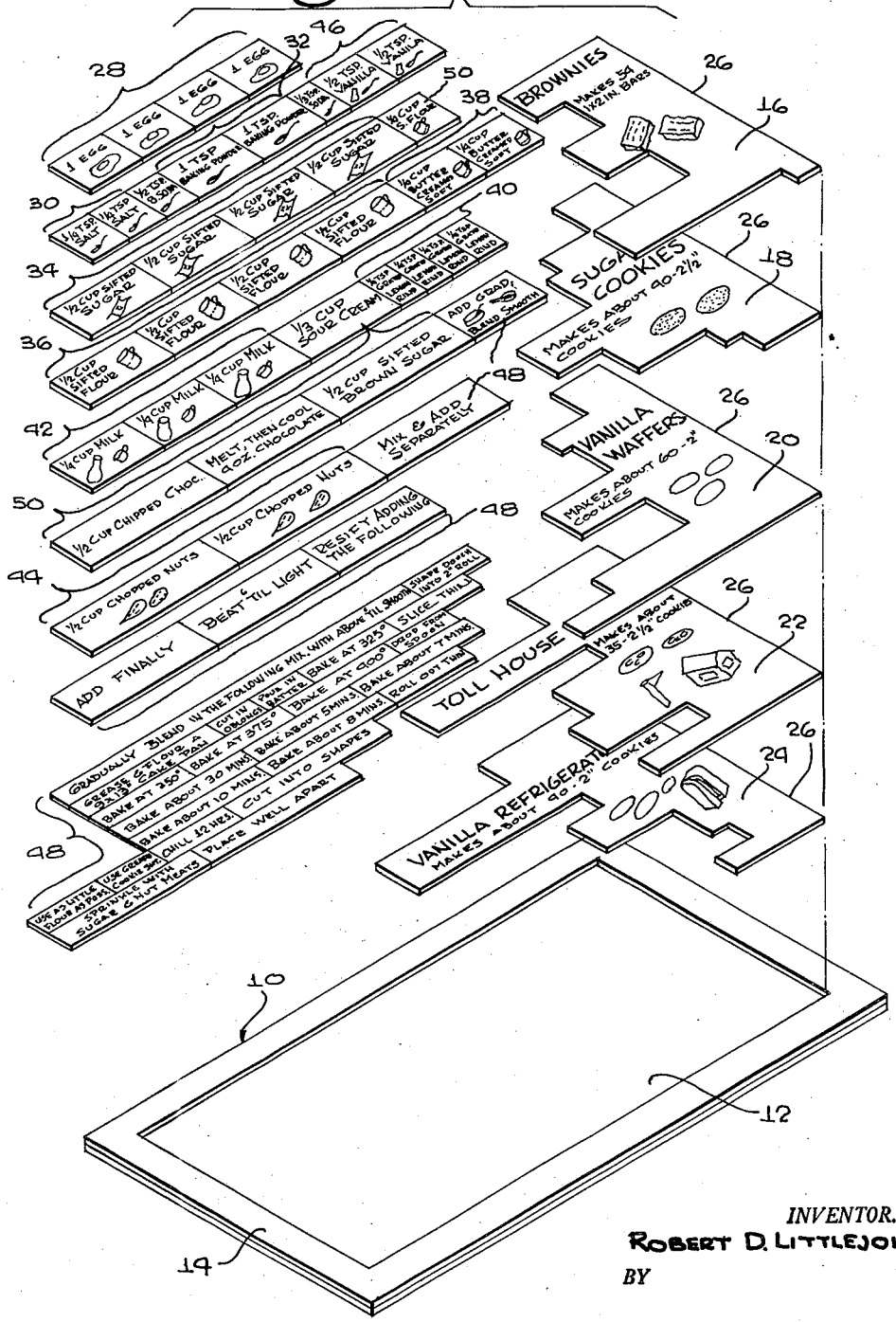
Fig. 1 is an exploded perspective view of game apparatus according to the present invention.

Referring to the drawings in detail, the illustrated game apparatus comprises a guide designated generally 10 which consists of a base sheet 12 carrying an open rectangular frame 14 on one side thereof. The frame 14 defines a rectangular recess in which game pieces are adapted to be placed, as will be readily understood upon reference to Figure 2. Product blocks 16, 18, 20, 22 and 24, preferably cut from sheet material, have one edge 26 which is of the same length as the inner edge of an end of the frame 14, and opposite edges of the product blocks are of irregular and differing formations, as illustrated, so that the product blocks differ from one another, as will be readily understood upon reference to Figure 1.

In addition to the product blocks, the apparatus comprises commodity game pieces 28, 30, 32, 34, 36, 38, 40, 42, 44 and 46, which may be in the form of cards, each bearing the name of a commodity and a unit of measurement thereof. The cards of each group are of the same size and shape, but the cards of the groups vary in size and shape so as to avoid confusing the cards of one group of cards with those of the other groups of cards. In addition to the cards naming commodities and units of measurement thereof, additional cards of different sizes and shapes are provided which bear indices showing the manner of treatment of the ingredients or commodities named on the cards required for producing a product named on a product card. The treatment cards are designated 48 and bear indices which indicate the treatment to be applied to the commodity or ingredients named on the commodity cards. In addition to the groups of commodity cards 48, individual commodity cards 50 bearing the names of commodities and the units of measurement of the commodities are provided.

Figure 4:
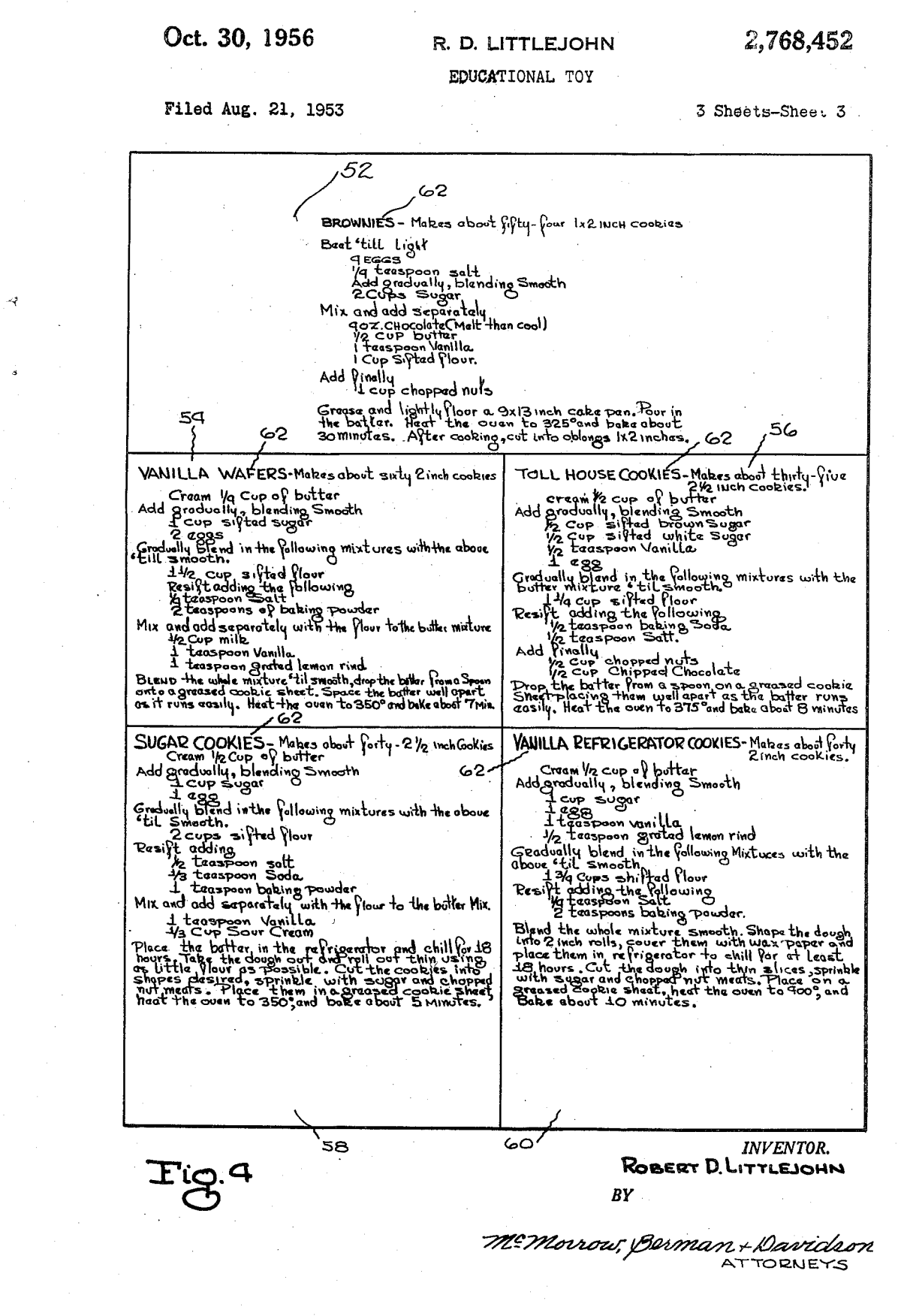

In addition to the product blocks and the cards above described, I provide sheets 52 containing instructions 54, 56, 58 and 60 (Fig. 4). Each group of instructions is provided with a title 62 designating the product resulting from the following of the instructions, so that the player may, by selecting the proper product block and placing it in the guide 10 and then following the related instructions the related commodity cards may be selected and placed within the frame 10 adjacent to the related product block, the product named on the product block being thereby shown in relation to the proper ingredients or commodities named as well as the proper treatments required to produce the product.

By way of example, there is shown in Figure 2 the result of following the instructions for producing brownies in which four egg cards from the group 28 are placed in the frame 14 the four eggs to be beaten according to the card 48, and have added thereto one-fourth of a teaspoon of salt represented by a commodity card selected from the group 30. Next, four cards selected from the group 34 are placed in the frame adjacent to the product block 16 to indicate that sugar is to be mixed with the lightly beaten eggs in accordance with the instruction card 48. Commodity cards selected from the group 38 are then placed in the frame 14 adjacent the product card 16, after which the treatment cards 48 selected according to the instruction sheets 52 are placed in the frame adjacent the commodity cards 38. The process is continued in this manner until through the proper selection of the commodity and the direction cards the frame 14 is completely filled with no gaps nor overlaps. In this way, a child or an adult can put together a recipe according to instructions and by proper selection of commodity cards and direction cards can go through the motions of preparing products according to the titles carried on the product blocks and in the groups of instructions. Proof of the correct putting together of the recipe is obtained by the fact of the absence of gaps or overlaps within the frame 14. Obviously, owing to the different shapes of the product blocks, it will be impossible to have the commodity and treatment cards fit within the frame properly where confusion has existed in following the recipe selected. In this way, a check may be had by the user to indicate whether or not the recipe has been correctly followed.

While in the foregoing there has been shown and described the preferred embodiment of this invention, it is to be understood that minor changes in the details of construction, combination and arrangement of parts may be resorted to without departing from the spirit and scope of the invention.

What is claimed is:

1. In educational game apparatus, a base, a rectangular open frame fixed on said base, said frame having opposed ends and opposed sides defining a rectangular recess, a product designating block having one longitudinal edge of the same length as one end of the recess and end edges, said product block being removably engaged in said recess with its said one longitudinal edge engaging the frame end at the said one end of the recess and with its end edges engaging the sides of the recess, said product block having another longitudinal edge provided with rectangular indentations, some of said indentations being of the same width and other of said indentations being of different widths, rectangular commodity cards, rectangular treatment cards, and additional commodity cards, some of said commodity, treatment and additional cards being of similar widths and others of said commodity, treatment, and additional cards being of differing widths, to fit indentations of the product block, selected ones of said commodity, treatment, and additional commodity cards being positioned in said recess, with some of such cards conformably engaged in related indentations of the product block and others of such cards engaged on edge-to-edge relation with each other and the sides and the remaining end of the frame and completely filling the space in the recess not filled by said product block, whereby the number and kinds of commodities and the nature of treatments are shown which are required for production of the product designated by the product block.

2. In educational game apparatus, a base, a rectangular open frame fixed on said base, said frame having opposed ends and opposed sides defining a rectangular recess, a product designating block having one longitudinal edge of the same length as one end of the recess and end edges, said product block being removably engaged in said recess with its said one longitudinal edge engaging the frame end at the said one end of the recess and with its end edges engaging the sides of the recess, said product block having another longitudinal edge provided with rectangular indentations, some of said indentations being of the same width and other of said indentations being of different widths, rectangular commodity cards, rectangular treatment cards, and additional commodity cards, some of said commodity, treatment and additional cards being of similar widths and others of said commodity, treatment, and additional cards being of differing widths, to fit indentations of the product block, selected ones of said commodity, treatment, and additional commodity cards being positioned in said recess, with some of such cards conformably engaged in related indentations of the product block and others of such cards engaged on edge-to-edge relation with each other and the sides and the remaining end of the frame and completely filling the space in the recess not filled by said product block, whereby the number and kinds of commodities and the nature of treatments are shown which are required for production of the product designated by the product block, some of the cards being of differing lengths.

References Cited in the file of this patent
UNITED STATES PATENTS

| | | |
|---|---|---|
| 242,709 | Stranders | June 7, 1881 |
| 2,314,387 | Carlsson | Mar. 23, 1943 |
| 2,317,206 | Major | Apr. 20, 1943 |
| 2,453,290 | Wetzel | Nov. 9, 1948 |
| 2,481,109 | Grace | Sept. 6, 1949 |